United States Patent Office 3,013,696
Patented Dec. 19, 1961

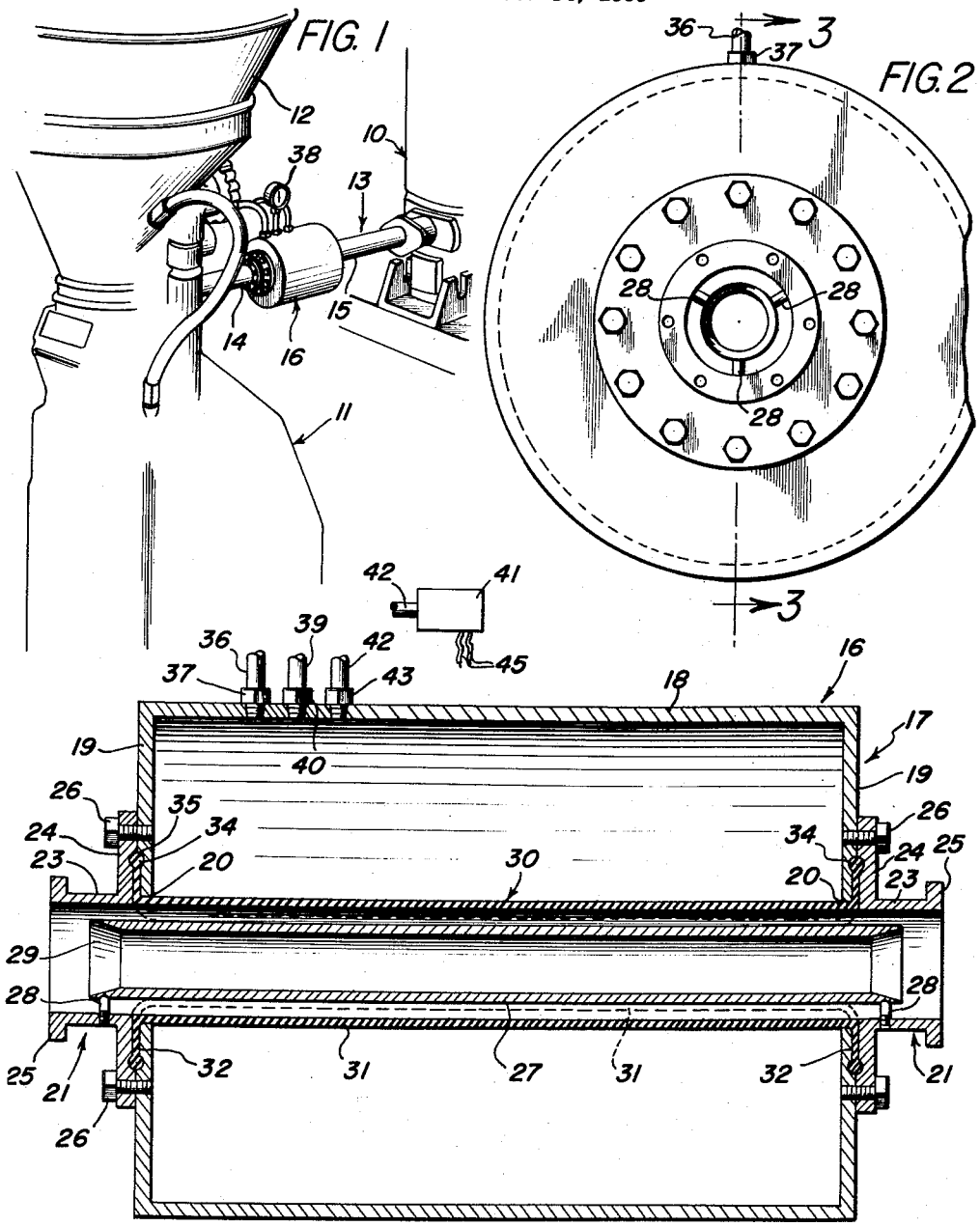

3,013,696
PRESSURE REGULATING DEVICE FOR MEAT CAN FILLER
Leonard J. Tralmer, Chicago, Ill., assignor to Continental Can Company, Inc., New York, N.Y., a corporation of New York
Filed Oct. 14, 1959, Ser. No. 846,316
11 Claims. (Cl. 222—56)

This invention relates in general to new and useful improvements in can filling apparatus, and more particularly seeks to provide a novel pressure regulating device for meat can fillers.

In a meat can filling line, the cans are individually positioned with respect to a can filling machine which intermittently feeds meat to the cans as the cans are positioned relative thereto. The common practice of supplying meat to the meat can filling machine is to provide a meat pumping machine which will supply the meat to the meat can filling machine as demanded. Such a machine has a limited capacity, and after the machine is filled with meat, it is sealed and pressure is applied to the meat to force it to the meat can filling machine. After the limited supply of meat is exhausted, it is necessary to open the machine, resupply the meat product, close the machine and again pressurize the machine.

It will be readily apparent that the production rate with the air pressurized type of meat pumping machine is relatively low. Accordingly, it has been recently proposed to substitute for the air pressure meat pumping machine a constant flow type of pump which has a hopper into which the comminuted meat product may be continuously fed. The constant volume pump, however, has presented a problem in that the use of the meat product by the meat can filling machine is intermittent and not continuous. Secondly, it is virtually impossible to control the rate of pumping action of the meat pump to produce a supply of meat which is identical with the demands of the meat can filling machine. Either there is an excess of meat, for which space must be provided, or a deficiency of meat, with the result that the cans will not be properly filled.

In view of the foregoing, it is an object of the invention to provide a pressure regulating device intermediate the meat pump and the meat can filling machine which is in the nature of a storage chamber and which will compensate for any differences in the output of the meat pump and the delivering of the meat to cans by the meat can filling machine.

Various types of pulsation dampening machines have been proposed in the past. While such machines include those having expandable diaphragms which will receive the excess supply of the product being pumped, prior devices have been of a construction that a certain amount of the matter is trapped therein and thus is subject to deterioration. It is therefore another object of the invention to provide a pulse dampening device which may be inserted between a meat pump and a meat can filling machine which will effectively store momentary excess quantities of meat products, and at the same time, is so constructed that none of the stored meat product will become trapped therein and subject to deterioration.

A further object of the invention is to provide a pulsation dampener which may be interposed between a pump and a delivery device for storing the matter being pumped during low periods of operation of the delivery machine and which will provide an available supply of the matter during peak periods of operation of the delivery machine.

A still further object of the invention is to provide a pulsation dampener which includes a large shell, a delivery pipe extending through the shell, the delivery pipe being of a size to handle the normal capacity of the supply line in which the pulsation dampener is mounted, and a diaphragm secured to the shell and being expandable within the shell for the temporary storage of matter, the shell being pressurized and normally urging the diaphragm towards the delivery pipe, whereby normal flow of the matter will be through the delivery pipe and excess matter passing through the supply line and not immediately used will be stored within the shell by expanding the diaphragm outwardly from the delivery pipe into the shell, the pressure on the diaphragm being sufficient to force the matter back into the supply line during times of peak demand for the matter.

A still further object of the invention is to provide a supply unit of the type which includes a constant volume pump and a delivery device which intermittently delivers the matter pumped thereto by the pump, and a supply line extending between the pump and the delivery machine, the supply line including a pulsation dampener which includes a pressurized shell having a delivery pipe extending therethrough and a diaphragm secured to the shell in sealed relation and extending about the delivery pipe, the delivery pipe being of a size to take the normal flow from the pump, and the diaphragm normally being urged against the delivery pipe by air pressure within the shell, the diaphragm being movable into the shell by an accumulation of the matter from the pump so as to provide for the temporary storage of the excess matter, and there being provided a control switch for the pump which is actuated by air pressure and which is communicated with the interior of the shell so that upon the pressure within the shell reaching a predetermined pressure due to the storage of a large amount of the matter within the shell, the pump will automatically be temporarily shut off.

With the above, and other objects in view that will hereinafter appear, the nature of the invention will be more clearly understood by reference to the following detailed description, the appended claims, and the several views illustrated in the accompanying drawing.

In the drawing:

FIGURE 1 is a schematic perspective view showing generally the details of a meat can filling unit which includes a meat pump, a meat can filling machine, and a supply line extending between the two incorporating a pulsation dampener.

FIGURE 2 is an enlarged end view of the pulsation dampener of FIGURE 1 removed from the supply line.

FIGURE 3 is an enlarged vertical sectional view taken substantially upon the plane indicated by the section line 3—3 of FIGURE 2, and shows the specific internal construction of the pulsation dampener.

Reference is now made to the drawings, wherein the general environment of the invention is best illustrated in FIGURE 1. FIGURE 1 schematically shows a portion of a conventional type of meat can filling machine, generally referred to by the numeral 10. A meat pump, generally referred to by the numeral 11, is provided for providing a constant supply of meat. The meat pump 11 includes a hopper 12 into which comminuted meat and meat products may be placed during the operation of the meat pump 11, so that the meat pump 11 may continuously operate. A supply line, generally referred to by the numeral 13, extends from the meat pump 11 to the meat can filling machine 10 and supplies meat from the meat pump 11 to the meat can filling machine 10.

The supply line 13 includes a section 14 which is secured to the meat pump 11, and a section 15, which is secured to the meat can filling machine 10. A pulsation dampener, generally referred to by the numeral 16, is positioned intermediate the sections 14 and 15 and is secured thereto by flange couplings.

The pulsation dampener 16 includes an enlarged shell, generally referred to by the numeral 17. The shell 17 includes a cylindrical body portion 18 and a pair of end walls 19. The end walls 19 have circular openings 20 formed in the central portions thereof, the openings 20 being aligned with each other.

A coupling fitting, generally referred to by the numeral 21, is secured to each of the end walls 19 on the exterior surface thereof. Each coupling fitting 21 includes a pipe section 23 having a relatively large diameter coupling flange 24 at one end thereof, and a smaller diameter coupling flange 25 at the other end thereof. The coupling flange 25 is of a size and shape to match coupling flanges of the supply pipe sections 14 and 15 in order that the pulsation dampener 16 may be readily secured thereto. The coupling flange 24 is secured in face abutting relation to the respective end wall 19 by a plurality of circumferentially spaced bolts 26.

A delivery pipe 27 extends through the shell 16 concentric thereto and terminates within the coupling fittings 21. The delivery pipe 27 is spaced from and disposed concentric to the pipe sections 23 of the coupling fittings 21. The delivery pipe 27 is supported from the coupling fittings 21 by a plurality of circumferentially spaced pins 28 which are supported by the pipe sections 23. At least one of the pins 28 has threaded engagement with the respective coupling fitting 21 to facilitate the releasing of the delivery pipe 27, thus facilitating the separation of the components of the pulsation dampener 16.

It is to be noted that the ends of the delivery pipe 27 are outwardly flared, as at 29, to facilitate the flow of matter therethrough. At this time, it is pointed out that the cross-section of the delivery pipe 27 is such that it will pass the normal output of the meat pump 11.

The pulsation dampener 16 also includes a tubular diaphragm, generally referred to by the numeral 30. The tubular diaphragm 30 includes a tubular body portion 31 which is provided at the ends thereof with outwardly extending annular mounting flanges 32. Each of the mounting flanges 32 terminates about its periphery in a bead 34.

It is to be noted that the diaphragm 30 is secured in place by clamping the mounting flanges 32 thereof between the connecting flanges 24 of the coupling fittings 21 and the end walls 19 of the shell 17. Both the end walls 19 and the connecting flanges 24 are recessed, as at 35, to receive the bead 34 and thus prevent the pulling of the flange 32 from between the coupling fittings 21 and the shell 17.

The tubular body portion 31 of the diaphragm 30 will have a normal diameter which is greater than the exterior diameter of the delivery pipe 27 and which is generally the same as the diameter of the pipe sections 23 of the coupling fittings 21. Thus, the tubular diaphragm 30 would have a tendency to maintain the solid line position of FIGURE 3.

In the use of the pulsation dampener, the interior of the shell 17 is pressurized. This is accomplished by providing the shell 17 with an air supply line 36 which is connected to the body portion 18 of the shell 17 by means of a fitting 37. An air pressure indicating valve 38 is communicated with the interior of the shell 17 to indicate the air pressure therein. The gauge 38 is coupled to the shell 17 through a short length of pipe 39 which, in turn, is connected to the body portion 18 through a fitting 40.

It is to be understood that in the operation of the pulsation dampener 16, the interior of the shell 17 is to be pressurized at a predetermined pressure by the introduction of air thereinto through the pressure supply line 36. After the shell 17 has been so pressurized, as indicated by the air pressure gauge 38, the air supply line 36 will be closed. Thus, the interior of the shell 17 will be sealed.

An air pressure actuated switch 41 is also provided. The air pressure actuated switch 41 is connected to the interior of the shell 17 by piping 42 which, in turn, is coupled to the body portion 18 by a fitting 43. The switch 41 is a normally closed switch and is opened when the air pressure within the shell 17 reaches a predetermined pressure. Wiring 45 is connected to the switch 41, the wiring 45 being part of the control circuit for the meat pump 11. Thus, when the switch 41 is opened, the operation of the meat pump 11 will discontinue.

*Operation*

The air pressure within the shell 17 initially acts upon the tubular diaphragm 30 to force the body portion 31 thereof inwardly into engagement with the delivery pipe 27, as indicated by dotted lines in FIGURE 3. When the meat pump 11 is initially operated, the meat or meat product therefrom will pass from the supply pipe section 14 into the pulsation dampener 16 and will be directed primarily through the delivery pipe 27. The meat or meat product will pass to the can filling machine 10. At this time, it is pointed out that in order that a sufficient amount of meat or meat product which is to be placed in the can may be available at all times, the output of the meat pump 11 is slightly greater than the demand of the meat can filling machine 10. Thus, as the meat pump 11 operates, there will be an abundance of meat or meat product available within the pulsation dampener 16. The meat will pass exteriorly of the supply pipe 27 and force the tubular diaphragm 30 outwardly into the shell 17, thus further compressing the air trapped within the shell 17.

As previously stated, the operation of the meat can filling machine 10 is intermittent in that it operates only when a can is positioned in alignment therewith. In view of this, there is momentarily an overabundance of the meat or meat product when the meat can filling machine 10 is awaiting the positioning of a next can, and then there is a greater demand for the meat or meat product than the meat pump 11 will supply when the meat can filling machine 10 is actually filling a can. The air pressure acting upon the diaphragm 30 permits the excess meat or meat products to be temporarily stored, and when the meat can filling machine 10 demands an overabundance of the meat or meat product, the diaphragm 30 acting inwardly on the meat or meat product will supply this additional demand.

Due to the fact that the meat pump 11 is such as to have an output greater than the demand of the meat can filling machine 10, even if the meat can filling machine 10 should operate at peak capacity, after a period of operation, there will be an oversupply of the meat product within the pulsation dampener 16. As the volume of the meat or product stored within the pulsation dampener 16 increases, the pressure within the shell 17 increases until it reaches the preset pressure of the switch 41, at which time the switch 41 will open and discontinue the operation of the meat pump 11. With the meat pump 11 not operating, the meat or meat product will continue to be delivered to the meat can filling machine 10 by the pressure of the diaphragm 30 on the meat or meat product disposed within the pulsation dampener 16. This will continue until substantially all the meat or meat product has been squeezed out of the pulsation dampener 16 by the diaphragm 30, at which time the pressure within the shell 17 will reach the preset switch closing position of the switch 41, at which time the operation of the meat pump 11 will again be initiated.

Although the pulsation dampener 16 has been specifically illustrated and described as being used in conjunction with a meat can filling machine and a meat pump, it is to be understood that it may be used in conjunction with any flowable product where there is a pulsation in a supply line. As pointed out above, the pulsation dampener 16 not only functions to level out any pulsations in the demand requirements of a unit, but also provides for the ample storage of matter to permit a constant volume pump to be used with the pump having an output slightly greater than the demand of the unit of which it is a part. This, of course, is highly desirable to assure a constant supply at the delivery machine.

From the foregoing, it will be seen that novel and advantageous provision has been made for carrying out the desired end. However, attention is again directed to the fact that variations may be made in the example apparatus disclosed herein without departing from the spirit and scope of the invention, as defined in the appended claims.

I claim:

1. A pulsation dampener for use intermediate a constant volume supply source and an intermittent delivery means to receive the matter being supplied during shut-down periods of the delivery means and to deliver the stored matter to the delivery means during the operation thereof, said pulsation dampener comprising an air-tight shell having fittings at opposite ends thereof for connecting said shell in a supply line with the matter being delivered by said supply line passing through said shell, an imperforate delivery tube passing through said shell in alignment with and extending between said fittings and normally receiving the matter passing into said shell, means mounting opposite ends of said delivery tube in spaced relation relative to said shell whereby excess matter may flow into and out of said shell around said delivery tube, a resilient tubular diaphragm disposed generally concentric to said delivery tube and having opposite ends thereof secured to said shell, and means pressurizing the interior of said shell about said diaphragm to urge said diaphragm towards said delivery tube and resist flow of matter into said shell.

2. The pulsation dampener of claim 1 wherein said fittings are releasably connected to said shell, and said diaphragm has end flanges clamped between said fittings and said shell.

3. The pulsation dampener of claim 2 wherein said diaphragm end flanges each terminates in a peripheral bead seated in a socket formed in at least one of said shell and shell fitting.

4. The pulsation dampener of claim 1 wherein the means mounting said delivery tube are in the form of spaced mounting pins, at least one of which is adjustably mounted to facilitate the removal of said delivery tube.

5. The pulsation dampener of claim 1 wherein the external diameter of said delivery tube is less than the diameter of the openings through said fittings, and the normal internal diameter of the diaphragm being substantially equal to the internal diameter of the fittings.

6. A pulsation dampener for use intermediate a constant volume supply source and an intermittent delivery means to receive the matter being supplied during shut-down periods of the delivery means and to deliver the stored matter to the delivery means during the operation thereof, said pulsation dampener comprising an air-tight shell having fittings at opposite ends thereof for connecting said shell in a supply line with the matter being delivered by said supply line passing through said shell, an imperforate delivery tube passing through said shell in alignment with and extending between said fittings and normally receiving the matter passing into said shell, means mounting opposite ends of said delivery tube in spaced relation relative to said shell whereby excess matter may flow into and out of said shell around said delivery tube, a resilient tubular diaphragm disposed generally concentric to said delivery tube and having opposite ends thereof secured to said shell, means pressurizing the interior of said shell about said diaphragm to urge said diaphragm towards said delivery tube and resist flow of matter into said shell, and pressure responsive control means connected to said shell in communication with the interior thereof for operation in response to the reception of a predetermined amount of matter within said diaphragm.

7. A container filling unit for filling containers with a flowable matter comprising a constant volume pump, a container filling machine for filling containers by intermittently delivering the matter as empty containers are supplied thereto, and means disposed intermediate said pump and said container filling machine and interconnecting said pump and said container filling machine for receiving and delivering all of the matter from said pump to said container filling machine, said delivery means including a pulsation dampener for receiving the matter supplied by said pump during shut-down periods of said container filling machine and delivering the stored matter to said container filling machine during the operation thereof, said pulsation dampener comprising an air-tight shell having fittings at opposite ends thereof for connecting said shell in a supply line with the matter being delivered by said supply line passing through said shell, an imperforate delivery tube passing through said shell in alignment with and extending between said fittings and normally receiving the matter passing into said shell, means mounting opposite ends of said delivery tube in spaced relation relative to said shell whereby excess matter may flow into and out of said shell around said delivery tube, a resilient tubular diaphragm disposed generally concentric to said delivery tube and having opposite ends thereof secured to said shell, and means pressurizing the interior of said shell about said diaphragm to urge said diaphragm towards said delivery tube and resist flow of matter into said shell.

8. The pulsation dampener of claim 7 wherein said fittings are releasably connected to said shell, and said diaphragm has end flanges clamped between said fittings and said shell.

9. The pulsation dampener of claim 8 wherein said diaphragm end flanges each terminates in peripheral bead seated in a socket formed in at least one of said shell and shell fitting.

10. The pulsation dampener of claim 7 wherein the means mounting said delivery tube are in the form of spaced mounting pins, at least one of which is adjustably mounted to facilitate the removal of said delivery tube.

11. The container filling unit of claim 7 together with pressure responsive control means for said pump connected to said shell in communication with the interior thereof for operation to stop said pump in response to the reception of a predetermined amount of the matter within said diaphragm.

References Cited in the file of this patent

UNITED STATES PATENTS

| | | |
|---|---|---|
| 1,058,572 | Finlay | Apr. 8, 1913 |
| 1,824,342 | Gillen et al. | Sept. 22, 1931 |
| 2,028,266 | Anderson | Jan. 21, 1936 |
| 2,609,001 | Hebord | Sept. 2, 1952 |
| 2,760,518 | Peet | Aug. 28, 1956 |
| 2,875,787 | Evans | Mar. 3, 1959 |
| 2,916,052 | Peters | Dec. 8, 1959 |